United States Patent
Sakai et al.

(10) Patent No.: US 12,162,763 B2
(45) Date of Patent: Dec. 10, 2024

(54) METHOD FOR PRODUCING PURIFIED CHLOROSILANES

(71) Applicant: Tokuyama Corporation, Yamaguchi (JP)

(72) Inventors: Junya Sakai, Yamaguchi (JP); Shoji Iiyama, Yamaguchi (JP)

(73) Assignee: Tokuyama Corporation, Yamaguchi (JP)

( * ) Notice: Subject to any disclaimer, the term of this patent is extended or adjusted under 35 U.S.C. 154(b) by 392 days.

(21) Appl. No.: 17/424,565

(22) PCT Filed: Jan. 21, 2020

(86) PCT No.: PCT/JP2020/001887
§ 371 (c)(1),
(2) Date: Jul. 21, 2021

(87) PCT Pub. No.: WO2020/153342
PCT Pub. Date: Jul. 30, 2020

(65) Prior Publication Data
US 2022/0073358 A1    Mar. 10, 2022

(30) Foreign Application Priority Data
Jan. 22, 2019 (JP) ................................ 2019-008194

(51) Int. Cl.
*C01B 33/107* (2006.01)
*B01D 3/00* (2006.01)
*B01D 3/34* (2006.01)

(52) U.S. Cl.
CPC ........ *C01B 33/10778* (2013.01); *B01D 3/009* (2013.01); *B01D 3/343* (2013.01); *C01B 33/1071* (2013.01); *C01P 2006/80* (2013.01)

(58) Field of Classification Search
None
See application file for complete search history.

(56) References Cited

U.S. PATENT DOCUMENTS

| | | | |
|---|---|---|---|
| 3,126,248 A | 3/1964 | Pohl et al. | |
| 3,403,003 A | 9/1968 | Morgenthaler | |
| 4,374,110 A * | 2/1983 | Darnell | C01B 33/10794 423/342 |
| 8,535,488 B2 | 9/2013 | Choi et al. | |
| 10,632,398 B2 | 4/2020 | Aigner et al. | |
| 2009/0068081 A1* | 3/2009 | Uehara | C01B 33/10778 423/342 |
| 2017/0190585 A1 | 7/2017 | Miyao et al. | |
| 2018/0244529 A1 | 8/2018 | Kishi et al. | |
| 2019/0209944 A1 | 7/2019 | Aigner et al. | |

FOREIGN PATENT DOCUMENTS

| | | | | |
|---|---|---|---|---|
| CN | 108862283 A | | 11/2018 | |
| JP | S57-034012 A | * | 2/1982 | |
| JP | S5734012 A | | 2/1982 | |
| JP | H05147922 A | * | 6/1993 | ....... C01B 33/10778 |
| JP | 2003294597 A | | 10/2003 | |
| JP | 2009062213 A | | 3/2009 | |
| JP | 2012533515 A | | 12/2012 | |
| JP | 5210350 B2 | | 6/2013 | |
| JP | 2017535505 A | | 11/2017 | |

OTHER PUBLICATIONS

Machine Translation for Kobayashi JP S57-34012 (Year: 1982).*
Machine Translation for Shimizu JP H05-147922 (Year: 1993).*
International Preliminary Report on Patentability, dated Aug. 5, 2021.
English Abstract for JP5210350B2, Jun. 12, 2013.
English Abstract for JPS5734012 A, Feb. 24, 1982.
English Abstract for JP2003294597 A, Oct. 15, 2003.
English Abstract for JP2009062213 A, Mar. 26, 2009.
English Abstract for CN108862283A, Nov. 23, 2018.
Extended European Search Report, Aug. 22, 2022.

* cited by examiner

*Primary Examiner* — Michael Forrest
(74) *Attorney, Agent, or Firm* — CAHN & SAMUELS, LLP

(57) ABSTRACT

A method for producing purified chlorosilanes includes bringing crude chlorosilanes, such as crude trichlorosilane and crude silicon tetrachloride, which contain a boron compound and/or a phosphorus compound, into contact with chlorine (preferably 1 ppm mole to 3000 ppm mole with respect to 1 mole of crude chlorosilanes) in presence of alkylphenol such as 2-methylphenol, and then distilling the crude chlorosilanes.

10 Claims, No Drawings

METHOD FOR PRODUCING PURIFIED CHLOROSILANES

This application is a U.S. national stage application of PCT/JP2020/001887 filed on 21 Jan. 2020 and claims priority to Japanese patent document 2019-008194 filed on 22 Jan. 2019, the entireties of which are incorporated herein by reference.

TECHNICAL FIELD

The present invention relates to a method for producing purified chlorosilanes. Specifically, the invention provides a method for obtaining high-purity purified chlorosilanes by removing, from crude chlorosilanes containing a boron compound and/or a phosphorus compound, these impurities.

BACKGROUND OF THE INVENTION

Chlorosilanes are used as raw materials for producing polycrystalline silicon for semiconductors. Trichlorosilane ($SiHCl_3$) is produced by a chlorination reaction of metallurgical grade low-purity silicon called "metal silicon" with hydrogen chloride or is produced by a chlorination reaction of metallurgical grade silicon with silicon tetrachloride in presence of hydrogen. Monochlorosilane ($SiH_3Cl$) and dichlorosilane ($SiH_2Cl_2$) are produced as by-products during production of trichlorosilane, and silicon tetrachloride ($SiCl_4$) is produced by a reaction of metallurgical grade silicon with hydrogen chloride or chlorine. Chlorosilanes obtained by such a reaction are mainly used as raw materials for producing polycrystalline silicon after purity is increased by a purification method such as distillation.

However, boron and/or phosphorus are/is mixed as impurities at a ratio of about several hundred ppb to several hundred ppm in metallurgical grade silicon as a raw material. When the crude chlorosilanes obtained from the metallurgical grade silicon are produced as described above, the boron and/or the phosphorus also undergoes a reaction and are/is mixed into the crude chlorosilanes as a boron compound and/or a phosphorus compound. The boron compound and/or the phosphorus compound contained as impurities exist(s) in various forms in the crude chlorosilanes. The boron compound and/or the phosphorus compound are/is also separated as the form(s) corresponding to a boiling point thereof when the crude chlorosilanes are separated and purified in a purification step.

However, the boron compound and/or the phosphorus compound having a boiling point close to that of the chlorosilanes are/is not separated and are/is supplied in a step of producing polycrystalline silicon, which causes contamination of the polycrystalline silicon to be obtained.

On the other hand, the polycrystalline silicon used as a raw material of a silicon wafer is required to have higher purity and higher resistance when a silicon wafer size is increased. Therefore, chlorosilane as a raw material needs to be further highly purified, and a high removal rate of the boron compound and/or the phosphorus compound is also required.

In the related art, various methods for separating the boron compound and/or the phosphorus compound from the chlorosilanes have been proposed. First, a separation method based on distillation has been proposed in Japanese Patent Application Laid-Open No. 2012-533515 (Patent Literature 1). In a method for converting an impurity into that having a higher boiling point and then distilling and separating the impurity, a method for converting an impurity into that having a higher boiling point by hydrolyzing the impurity has been proposed in Japanese Patent Application Laid-Open No. 2016-17023 (Patent Literature 2), and a method for converting an impurity into that having a higher boiling point by complexing the impurity has been proposed in Japanese Patent Application Laid-Open No. S57-34012 (Patent Literature 3), Japanese Patent No. 5210350 (Patent Literature 4), etc. Further, a method for selectively adsorbing an impurity to an adsorbent to remove the impurity has been proposed in Japanese Patent Application Laid-Open No. 2017-535505 (Patent Literature 5).

CITATION LIST

Patent Literature

Patent Literature 1: Japanese Patent Application Laid-Open No. 2012-533515
Patent Literature 2: Japanese Patent Application Laid-Open No. 2016-17023
Patent Literature 3: Japanese Patent Application Laid-Open No. S57-34012
Patent Literature 4: Japanese Patent No. 5210350
Patent Literature 5: Japanese Patent Application Laid-Open No. 2017-535505

SUMMARY OF INVENTION

Technical Problem

However, in the separation method based on distillation, since the boron compound and/or the phosphorus compound cannot be separated from the chlorosilanes by a general distillation operation, it is necessary to perform distillation in a distillation column having many plates for high purification. Therefore, the method is not an economical method since equipment cost is high, energy consumption for distillation is large, and the chlorosilanes are discarded together with impurities.

The method for converting an impurity into that having a higher boiling point by selectively hydrolyzing the impurity and then distilling and separating the impurity has a problem that purity of purified chlorosilanes to be obtained is insufficient because phosphorus is eluted from a material of the distillation column in a subsequent distillation operation due to hydrogen chloride by-produced by hydrolysis or because a compound which is hydrolyzed and converted into that having a higher boiling point is subsequently decomposed at a temperature of a reboiler of a distillation column and returns to a boron compound or phosphorus compound which has a boiling point close to that of the chlorosilanes.

The method for selectively adsorbing an impurity to an adsorbent to remove the impurity is not an economical method because a large amount of adsorbent is required, a filter for filtering flakes of the adsorbent is required after an adsorption column, and it is necessary to provide adsorption columns in parallel for regeneration treatment of the adsorption columns in a continuous process, and thus equipment cost is extremely enormous.

In the method for converting an impurity into that having a higher boiling point by selectively complexing the impurity and then distilling and separating the impurity, various complexing agents have been studied as the most effective method if an optimum complexing agent can be selected. However, a sufficiently satisfactory one has not been found, and in particular, a method for using alkylphenol in presence of aluminum chloride shown in Patent Literature 3 has high removability to some extent for a phosphorus compound, particularly for a phosphorus compound not containing hydrogen, but still has not exerted a high effect for a boron compound.

Therefore, an object of the present invention is to solve these problems and to provide a method for producing purified chlorosilanes suitable for industrial use, in which a boron compound and/or a phosphorus compound from crude chlorosilanes can be easily removed at a high removal rate.

Solution to Problem

As a result of intensive studies to solve the above technical problems, the inventors of the present invention have reached a conclusion that, in a method using alkylphenol as a complexing agent, a boron compound and/or a phosphorus compound cannot be sufficiently complexed by a method for bringing the crude chlorosilanes into contact with only the alkylphenol and thus precise distillation with higher accuracy is indispensable in order to remove the remaining boron compound and/or phosphorus compound. That is, this method is not a method suitable for industrial use that can easily remove the boron compound and/or the phosphorus compound from the crude chlorosilanes at a high removal rate, but the inventors of the present invention have deepened the studies and found that removability based on the subsequent distillation is greatly improved if the crude chlorosilanes are brought into contact with the alkylphenol and chlorine, and purified chlorosilanes substantially free of boron and/or phosphorus can be obtained even by simple distillation, for example, simple distillation. Thus, the present invention was invented.

That is, the present invention is a method for producing purified chlorosilanes in which crude chlorosilanes containing a boron compound and/or a phosphorus compound is brought into contact with chlorine in presence of alkylphenol and then distilling the crude chlorosilanes.

Advantageous Effects of Invention

According to the method of the present invention, the boron and/or phosphorus can be separated and removed at an extremely high level by bringing the crude chlorosilanes containing the boron compound and/or the phosphorus compound into contact with chlorine in presence of alkylphenol and then distilling the crude chlorosilanes. Therefore, purified chlorosilanes can be produced by the above distillation in which boron and/or phosphorus is highly reduced by easy distillation, for example, simple distillation, without providing a distillation column having many plates for high purification or made of a special material.

Therefore, the purification method of the present invention is extremely useful as a technique of purifying industrial chlorosilanes.

DESCRIPTION OF EMBODIMENTS

In the present invention, among various silane molecules composed of silicon atoms and hydrogen atoms, chlorosilanes have a molecular structure in which a part of or all of hydrogen atoms are substituted with chlorine atoms, examples of the chlorosilanes include one or a mixture of two or more selected from monochlorosilane, dichlorosilane, trichlorosilane, and silicon tetrachloride, and the trichlorosilane is particularly preferable. Crude chlorosilanes containing a boron compound and/or a phosphorus compound (hereinafter, also simply referred to as crude chlorosilanes) are an object to be purified in the present invention. As a production raw material, these crude chlorosilanes obtained by a reaction using the metallurgical grade silicon can be preferably targeted, and in particular, crude trichlorosilane, which is produced by chlorination reaction of the metallurgical grade silicon with hydrogen chloride or is produced by chlorination reaction of the metallurgical grade silicon with silicon tetrachloride in presence of hydrogen, is more preferable.

The boron compound contained in the crude chlorosilanes is often contained in a form of various hydrides or chloride hydrides or chlorides such as boron trichloride and diboron tetrachloride. In the present description, all of these forms are collectively referred to as the boron compound.

Further, the phosphorus compound is often contained in a form of various hydrides or chloride hydrides or chlorides such as phosphorus trichloride, phosphorus hydride, and phosphorus pentachloride. In the present description, all these forms are collectively referred to as the phosphorus compound.

Generally, in crude chlorosilanes obtained by a reaction of metallurgical grade silicon, the boron compound and/or the phosphorus compound is present at 10 ppb to several hundred ppm in terms of boron or phosphorus element. A content of the boron compound and/or the phosphorus compound of the crude chlorosilanes is respectively 1 ppm to 200 ppm when general metallic silicon is used, and is respectively 10 ppb to 2 ppm when physical purified metallurgical grade silicon is used.

A feature of the present invention is that crude chlorosilanes containing the boron compound and/or phosphorus compound are brought into contact with chlorine in presence of alkylphenol and then are distilled. That is, in distillation of the crude chlorosilanes, by bringing the crude chlorosilanes into contact with chlorine in the presence of alkylphenol, the boron compound and/or the phosphorus compound remain(s) in a bottom fluid of a distillation column at an extremely high ratio, the content of the boron compound and/or the phosphorus compound in a distillate can be greatly reduced, and high-purity chlorosilanes substantially free of boron and/or phosphorus can be obtained.

Here, purified chlorosilanes substantially free of the boron compound and/or the phosphorus compound refer to chlorosilanes in which a liquid of the chlorosilanes is analyzed by an inductively coupled plasma (ICP) emission spectrophotometer and the content of the boron compound and/or the phosphorus compound is 1 ppba or less in terms of boron or phosphorus element. In the present invention, the reason why the chlorosilanes in which the boron compound and/or the phosphorus compound is greatly reduced as described above is obtained is not necessarily clear, but the inventors of the present invention presume that the reason may be due to the following actions.

That is, the boron compound and the phosphorus compound contained in the crude chlorosilanes obtained from the metallurgical grade silicon are usually contained in the form of chlorides or hydrides as described above. In addition, with regard to such chlorides and hydrides, when only the alkylphenol is added, complete chlorides such as $BCl_3$, $PCl_3$, and $PCl_5$ are complexed and converted into that having higher boiling points, but a chloride hydride of boron compound or phosphorus compound such as $BH_nCl_{3-n}$ (n=1, 2, 3), $PH_mCl_{3-m}$ (m=1, 2, 3), and $PH_tCl_{5-t}$ (t=1, 2, 3, 4, 5) is not complexed but remains in the chlorosilanes and is hardly separated by subsequent simple distillation, and as a result, high-purity purified chlorosilanes cannot be obtained. In contrast, in the present invention, when not only the alkylphenol but also the chlorine is allowed to coexist, each of chloride hydrides of boron or phosphorus is completely chlorinated and then is complexed with the alkylphenol and converted into that having a higher boiling point. Therefore, it is presumed that these chloride hydrides can also be separated and removed at an extremely high level by the subsequent distillation, and the boron compound and/or the phosphorus compound can be significantly reduced.

In the present invention, known alkylphenol and chlorine is used without particular limitation. The alkylphenol is preferably in a form of a liquid at a boiling point (31.8° C.) of trichlorosilane in terms of handling. By using liquid alkylphenol, there is no problem of clogging of an apparatus because a solidified product is not produced in distillation.

In order to avoid entry of the alkylphenol into a distillation distillate as much as possible, it is preferable to use alkylphenol having a boiling point sufficiently higher than a boiling point of the distillate.

A specific example of the alkylphenol includes a compound represented by the following general Formula (1).

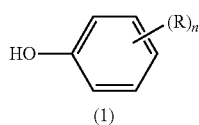

[Chem. 1]

(1)

In the formula, R is alkyl group ($C_nH_{2n+1}$) of the same type or different types having 1 to 4 carbon atoms, and n is an integer of 1 to 4. Examples of a group suitable as the alkyl group include linear or branched groups having 1 to 4 carbon atoms, such as a methyl group, an ethyl group, an n-propyl group, an i-propyl group, an n-butyl group, an s-butyl group, and a t-butyl group.

Among alkylphenols represented by the general Formula (1), specific examples of a compound that can be suitably used include 2-n-butylphenol, 3-n-butylphenol, 4-n-butylphenol, 2-s-butylphenol, 3-s-butylphenol, 4-s-butylphenol, 2-t-butylphenol, 3-t-butylphenol, 4-t-butylphenol, 2-i-propylphenol, 3-i-propylphenol, 4-i-propylphenol, 2-n-propylphenol, 3-n-propylphenol, 4-n-propylphenol, 2-ethylphenol, 3-ethylphenol, 4-ethylphenol, 2-methylphenol, 3-methylphenol, and 4-methylphenol.

Among the alkylphenols, a compound in which a group represented by R in the general Formula (1) is a methyl group and n is 1 is especially and suitably used because separation efficiency from the chlorosilanes is remarkably high. 2-methylphenol is the most preferable.

In order to prevent generation of a solidified product due to a reaction with the chlorosilanes during addition and to perform a stable distillation operation for a long period of time, it is preferable to use purified alkylphenols having a moisture content of 1% by weight or less, preferably 0.6% by weight or less.

The alkylphenol described above is not necessarily limited to one type in use, and two or more types thereof may be used in combination. Further, in this case, a ratio of the alkylphenols used is also not particularly limited and can be any ratio.

An amount of the alkylphenol is not particularly limited, but if the amount is too much, a chlorination reaction of the crude chlorosilanes proceeds, which is not economical. On the other hand, if the amount is too small, a high purification effect of the crude chlorosilanes is reduced. From these points, an amount of the alkylphenol is preferably 1 ppm mole to 3000 ppm mole, more preferably 5 ppm mole to 1000 ppm mole, and further preferably 10 ppm mole to 100 ppm mole with respect to 1 mole of crude chlorosilanes.

In addition, a contact amount of the chlorine is not particularly limited, but if the contact amount is too much, the chlorination reaction of the crude chlorosilanes proceeds, which is not economical. On the other hand, if the contact amount is too small, the high purification effect of the crude chlorosilanes is reduced. From these points, the contact amount of the chlorine is preferably 1 ppm mole to 2000 ppm mole, more preferably 5 ppm mole to 500 ppm mole, and further preferably 10 ppm mole to 40 ppm mole with respect to 1 mole of crude chlorosilanes.

Even if another chlorine compound is used instead of chlorine as a compound to coexist with the alkylphenol, a purification effect of the crude chlorosilanes as high as that of the present invention cannot be obtained. On the contrary, aluminum chloride is used as such a chlorine compound in Patent Literature 3, but since the aluminum chloride is easy to be sublimed during distillation and a vaporized aluminum chloride has high adhesion, the aluminum chloride precipitates on an inner wall of a reboiler of the distillation column and a peripheral equipment thereof during a distillation operation and causes clogging of pipes, corrosion of materials, and the like, so that it is desirable not to use the aluminum chloride as much as possible.

In the method of the present invention, in order to purify crude chlorosilanes with high efficiency, it is preferable that the crude chlorosilanes are further brought into contact with oxygen during a period from when the crude chlorosilanes are brought into contact with the chlorine in the presence of the alkylphenol until when the subsequent distillation is started. Although the reason why the purification efficiency of the crude chlorosilanes is further improved by bringing the crude chlorosilanes into contact with the oxygen during the period from when the crude chlorosilanes are brought into contact with the chlorine until when the distillation is started is not necessarily clear, the inventors of the present invention presume that the reason is due to the following actions. That is, there is a little complex compound of completely chlorinated boron or the phosphorus compound and the alkylphenol, but a part of the complex compound may be thermally decomposed by heating during distillation to return to the original boron compound or phosphorus compound. It is considered that this is because by bringing the crude chlorosilanes into contact with the oxygen during a period until the distillation, the oxygen further acts on the complex compound, whereby pyrolytic property is improved and the complex compound is not thermally decomposed even being heated during distillation.

Air may be used as a supply source of the oxygen, and the oxygen may be supplied by a mixed gas obtained by diluting an oxygen-containing gas with an inert gas.

A contact amount of the oxygen is not particularly limited, but if the contact amount is too much, the chlorination reaction of the crude chlorosilanes proceeds, which is not economical. On the other hand, if the contact amount is too small, the high purification effect of the crude chlorosilanes is reduced. From these points, the contact amount of the oxygen is preferably 0.1 ppm mole to 1000 ppm mole, more preferably 0.5 ppm mole to 100 ppm mole, and further preferably 1 ppm mole to 20 ppm mole with respect to 1 mole of crude chlorosilanes.

Although a reaction temperature at which the crude chlorosilanes are brought into contact with the chlorine in the presence of the alkylphenol is not particularly limited, if the reaction temperature is too high, a thermal decomposition rate of a complex of the boron compound and/or the phosphorus compound is fast and substantially, the complex is hardly formed. On the other hand, if the reaction temperature is too low, a complexation becomes slow and a reaction time needs to be lengthened, which is inefficient. From these points, the reaction temperature is preferably in a range of 10° ° C. to 90° C., more preferably 15° C. to 80° C., and further preferably 20° ° C. to 60° C.

Further, although a pressure of the above reaction is not particularly limited, if the pressure is too high, a reactor needs to be a pressure vessel, which is not preferable. On the other hand, if the pressure is too low, the complexing reaction is slow and the reaction time needs to be lengthened, which is inefficient. From these points, a reaction pressure is preferably in a range of 10 kPaG to 250 kPaG, more preferably 20 kPaG to 200 kPaG, and further preferably 30 kPaG to 100 kPaG.

In the distillation of the crude chlorosilanes of the present invention, a method for bringing the crude chlorosilanes into contact with the alkylphenol, the chlorine, and if necessary, the oxygen is not particularly limited, but a method in which the alkylphenol, the chlorine, and the oxygen are added to the crude chlorosilanes to be supplied to the distillation, a method in which the alkylphenol, the chlorine, and the oxygen are directly added to the distillation column before the distillation operation, or a method in which both methods are combined is generally exemplified.

In the present invention, in regard to a method for distilling the crude chlorosilanes, which is carried out after the crude chlorosilanes are brought into contact with the alkylphenol, the chlorine, and if necessary, the oxygen, known apparatus and methods are adopted without particular limitation. For example, as a distillation apparatus, either a plate-type distillation column or a packed-type distillation column can be used.

Further, as a distillation method, either batch distillation or continuous distillation can be carried out.

In the above distillation operation, the number of distillation columns to be used may be determined depending on the type of chlorosilanes obtained from the crude chlorosilanes.

For example, in a case of crude chlorosilanes obtained by chlorinating the metallurgical grade silicon, a method is generally used in which a plurality of distillation columns is used, trichlorosilane and chlorosilanes having a boiling point lower than that of the trichlorosilane are distilled in a first distillation column, and then the bottom fluid is distilled in a second distillation column, and silicon tetrachloride is distilled. In this case, if the alkylphenol, chlorine, and oxygen present as necessary are added to the first distillation column during distillation, the alkylphenol, chlorine, and oxygen are supplied to the second distillation column together with the bottom fluid, and therefore, distillation can be performed without newly adding the alkylphenol, chlorine, and oxygen to the second distillation column. Further, from the bottom of the second distillation column, chlorosilanes having a high boiling point such as hexachlorodisilane, polymers of silanes, and a complex containing boron and/or phosphorus and alkylphenol are extracted.

The chlorosilanes purified by such a distillation operation may be further distilled, if necessary, and supplied to, for example, a silicon precipitation step to obtain high-purity silicon. Since the purified chlorosilanes to be subjected to the above further distillation operation substantially do not contain boron and/or phosphorus, it is not necessary to particularly add alkylphenol, chlorine, and oxygen for distillation.

In the purified chlorosilanes obtained by the above method, the boron compound and/or the phosphorus compound are/is greatly reduced, and as described above, it is also possible to produce the chlorosilanes substantially free of these compounds (contents of the boron compound and/or the phosphorus compound analyzed by the ICP emission spectrophotometer are both 1 ppba or less in terms of boron or phosphorus element). By using such high-purity purified chlorosilanes as raw materials, it is possible to obtain high-purity polycrystalline silicon having a resistivity of 1000 Ωcm or more, which is required for semiconductor grade.

EXAMPLES

Hereinafter, examples and a comparative example will be shown to more specifically explain the present invention, but the present invention is not limited to these examples.

Example 1

50 kg of a mixture (crude chlorosilanes) of dichlorosilane, trichlorosilane, and silicon tetrachloride obtained from metallurgical grade silicon (31 mole in terms of number of moles, a boron compound content: 1 ppma in terms of boron element, a phosphorus compound content: 8 ppma in terms of phosphorus element) was poured into a stirred tank equipped with a stirrer, a temperature of the stirred tank was maintained at 40° C. and a pressure was maintained at 80 kPaG, then 1.5 g of 2-methylphenol (45 ppm in a molar ratio with respect to the crude chlorosilanes) was added, thereafter, a chlorine gas was blown in at a flow rate of 20 cc/min for 10 minutes (29 ppm in a molar ratio with respect to the crude chlorosilanes), the mixture was stirred and mixed, and then distillation was performed in a stainless steel-made distillation column equivalent to having 30 theoretical plates to obtain 8.37 kg of trichlorosilane containing dichlorosilane as a distillate and 41.63 kg of bottom fluid.

When the distillate was analyzed by an inductively coupled plasma (ICP) emission spectrophotometer, contents of a boron compound and a phosphorus compound both were 1 ppba or less in terms of boron or phosphorus element. As a result of producing polycrystalline silicon by the Siemens method by using this distillate, polycrystalline silicon having a resistivity of 2500 Ωcm was obtained.

When the bottom fluid was analyzed, the original boron and phosphorus were all concentrated in the bottom fluid.

Further, when the bottom fluid was distilled in a subsequent distillation column to distill and analyze silicon tetrachloride, contents of the boron compound and the phosphorus compound both were 1 ppba or less in terms of boron or phosphorus element.

Comparative Example 1

Comparative Example 1 was carried out in the same manner as in Example 1 except that distillation was performed without blowing a chlorine gas, and 8.37 kg of trichlorosilane containing dichlorosilane as a distillate and 41.63 kg of bottom fluid were obtained. When the distillate was analyzed, 220 ppba of boron and 330 ppba of phosphorus were detected. When the bottom fluid was analyzed, a content of a boron compound was 1.3 ppma in terms of boron element and a content of a phosphorus compound was 11 ppma in terms of phosphorus element.

As seen from the above, even when only 2-methylphenol was brought into contact with the crude chlorosilanes, the boron compound and phosphorus compound which were complexed and converted into those having higher boiling points were respectively only about 80% and about 95% with respect to original contents thereof, and remaining boron compound and phosphorus compound were not complexed (boiling points did not change) and cannot be separated by simple distillation thereafter. In order to further purify this distillate, it is necessary to carry out more precise distillation, which is not suitable for a purpose of complexing the boron compound and the phosphorus compound to simplify a distillation operation.

Example 2

Example 2 was carried out in the same manner as in Example 1 except that after chlorine was blown in at a flow rate of 20 cc/min for 10 minutes, and air was blown in at a flow rate of 10 cc/min for 5 minutes (an addition amount in terms of oxygen was 15 ppm in a molar ratio with respect to the crude chlorosilanes), and the mixture was stirred and then was distilled. When the distillate was analyzed, contents of the boron compound and the phosphorus compound both were 1 ppba or less in terms of boron or phosphorus element, and as a result of producing polycrystalline silicon by the Siemens method by using this distillate, polycrystalline silicon having a resistivity of 4200 Ωcm was obtained.

Examples 3 to 7

In the same manner as in Example 1 except that alkylphenol shown in Table 1 was used instead of 2-methylphenol in Example 1, after mixing/stirring with the crude chlorosilanes, trichlorosilane was distilled, and the content of the boron compound and the content of the phosphorus compound in the distillate were measured as a boron concentration and a phosphorus concentration. Further, each distillate was used to produce polycrystalline silicon by the Siemens method, and the resistivity thereof was measured. Results were shown in Table 1.

TABLE 1

| Examples | Alkylphenol | Distillate (kg) | Bottom fluid (kg) | Boron concentration (ppba) in distillate | Phosphorus concentration (ppba) in distillate | Resistivity (cm) of polycrystalline silicon |
|---|---|---|---|---|---|---|
| 3 | 2-ethylphenol | 8.37 | 41.63 | 1 or less | 1 or less | 1820 |
| 4 | 3-n-propylphenol | 8.33 | 41.65 | 1 or less | 1 or less | 1460 |
| 5 | 4-i-propylphenol | 8.35 | 41.64 | 1 or less | 1 or less | 1400 |
| 6 | 3-t-butylphenol | 8.39 | 41.59 | 1 or less | 1 or less | 1200 |
| 7 | 4-s-butylphenol | 8.41 | 41.58 | 1 or less | 1 or less | 1040 |

Examples 8 to 12

In the same manner as in Example 1 except that a mixture of dichlorosilane, trichlorosilane, and silicon tetrachloride, which uses metallurgical grade silicon as a raw material, was produced by changing a quality of the metallurgical grade silicon, and that crude chlorosilanes containing boron and phosphorus of various concentrations were produced, and that conditions shown in Table 2 that are an addition amount of 2-methylphenol, an addition amount of chlorine gas, an addition amount of oxygen gas, and a temperature and a pressure of a stirred tank of a mixed solution were set, after mixing/stirring with the crude chlorosilanes, trichlorosilane was distilled, and the content of the boron compound and the content of the phosphorus compound in the distillate were measured as a boron concentration and a phosphorus concentration. Further, each distillate was used to produce polycrystalline silicon by the Siemens method, and the resistivity thereof was measured. Results thereof were shown in Tables 2 and 3.

TABLE 2

| Examples | Boron content (ppma) | Phosphorus content (ppma) | Alkylphenol addition amount (ppm molar ratio with respect to crude chlorosilane) | Chlorine addition amount | Oxygen addition amount | Temperature (° C.) of stirred tank | Pressure (kPaG) of stirred tank | Distillate (kg) | Bottom fluid (kg) |
|---|---|---|---|---|---|---|---|---|---|
| 8 | 5 | 13 | 7 | 75 | 1 | 40 | 80 | 8 | 42 |
| 9 | 5 | 13 | 89 | 17 | 2 | 41 | 79 | 8 | 42 |
| 10 | Detection lower limit or less | 2 | 7 | 75 | 1 | 41 | 75 | 8 | 42 |
| 11 | Detection lower limit or less | 2 | 89 | 17 | 2 | 40 | 80 | 8 | 42 |
| 12 | Detection lower limit or less | 2 | 2 | 3 | 0 | 41 | 80 | 8 | 42 |

TABLE 3

| Examples | Boron concentration (ppba) in distillate | Phosphorus concentration (ppba) in distillate | Resistivity (Ωcm) of polycrystalline silicon |
|---|---|---|---|
| 8 | 1 or less | 1 or less | 2300 |
| 9 | 1 or less | 1 or less | 3850 |
| 10 | 1 or less | 1 or less | 2740 |
| 11 | 1 or less | 1 or less | 4100 |
| 12 | 1 or less | 1 or less | 1040 |

The invention claimed is:

1. A method for producing purified chlorosilanes, comprising:
bringing crude chlorosilanes containing a boron compound and/or a phosphorus compound into contact with chlorine in presence of alkylphenol,
distilling the crude chlorosilanes, and
bringing the crude chlorosilanes into contact with oxygen during a period from when the crude chlorosilanes are brought into contact with the chlorine in the presence of the alkylphenol until when subsequent distilling is started,
wherein an amount of the alkylphenol is 1 ppm mole to 100 ppm mole with respect to 1 mole of the crude chlorosilanes.

2. The method for producing purified chlorosilanes according to claim 1, wherein the alkylphenol is a compound represented by a general Formula (1),
wherein R is alkyl group of the same type or different types having 1 to 4 carbon atoms and n is an integer of 1 to 4.

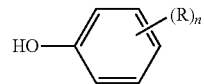

(1)

3. The method for producing purified chlorosilanes according to claim 1, wherein the alkylphenol is 2-methylphenol.

4. The method for producing purified chlorosilanes according to claim 1, wherein a contact amount of the chlorine is 1 ppm mole to 2000 ppm mole with respect to 1 mole of the crude chlorosilanes.

5. The method for producing purified chlorosilanes according to claim 1, wherein a contact amount of oxygen is 0.1 ppm mole to 1000 ppm mole with respect to 1 mole of the crude chlorosilanes.

6. The method for producing purified chlorosilanes according to claim 1, wherein a temperature when the crude chlorosilanes are brought into contact with the chlorine in the presence of the alkylphenol is in a range of 10° C. to 90° C.

7. The method for producing purified chlorosilanes according to claim 1, wherein a pressure condition when the crude chlorosilanes are brought into contact with the chlorine in the presence of the alkylphenol is in a range of 10 kPaG to 250 kPaG.

8. The method for producing purified chlorosilanes according to claim 1, comprising bringing crude chlorosilanes containing boron hydride or boron chloride into contact with chlorine in the presence of alkylphenol.

9. The method for producing purified chlorosilanes according to claim 1, comprising bringing crude chlorosilanes containing phosphorous hydride or phosphorous chloride into contact with chlorine in the presence of alkylphenol.

10. The method for producing purified chlorosilanes according to claim 1, wherein the chlorine comprises chlorine gas.

* * * * *